(12) United States Patent
Zhang et al.

(10) Patent No.: US 12,533,666 B2
(45) Date of Patent: Jan. 27, 2026

(54) LOW-TEMPERATURE AND HIGH-EFFICIENCY AMMONIA DECOMPOSITION CATALYST, PREPARATION METHOD AND APPLICATION THEREOF

(71) Applicant: SOUTHWEST PETROLEUM UNIVERSITY, Chengdu (CN)

(72) Inventors: Hui Zhang, Chengdu (CN); Xiaodong Zhao, Chengdu (CN); Jie Wen, Chengdu (CN); Jiahong Cai, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 450 days.

(21) Appl. No.: 17/965,744

(22) Filed: Oct. 13, 2022

(65) Prior Publication Data

US 2024/0058803 A1 Feb. 22, 2024

(30) Foreign Application Priority Data

Aug. 17, 2022 (CN) .......................... 202210986606.1

(51) Int. Cl.
| | | |
|---|---|---|
| *B01J 29/76* | (2006.01) | |
| *B01J 21/18* | (2006.01) | |
| *B01J 23/755* | (2006.01) | |
| *B01J 37/02* | (2006.01) | |
| *B01J 37/03* | (2006.01) | |

(Continued)

(52) U.S. Cl.
CPC .............. *B01J 29/76* (2013.01); *B01J 21/18* (2013.01); *B01J 23/755* (2013.01); *B01J 37/0215* (2013.01); *B01J 37/0236* (2013.01); *B01J 37/036* (2013.01); *B01J 37/04* (2013.01); *B01J 37/088* (2013.01); *C01B 3/047* (2013.01)

(58) Field of Classification Search
None
See application file for complete search history.

(56) References Cited

FOREIGN PATENT DOCUMENTS

CN 106475132 A * 3/2017

OTHER PUBLICATIONS

Huo et al., Spatial confinement and electron transfer moderating Mo—N bond strength for superior ammonia decomposition catalysis , Applied Catalysis B: Environmental 294, 2021 (Huo) (Year: 2021).*

(Continued)

*Primary Examiner* — Keling Zhang
(74) *Attorney, Agent, or Firm* — Zhigang Ma

(57) ABSTRACT

A low-temperature and high-efficiency ammonia decomposition catalyst is disclosed, which includes a support and an active component. The support is SBA-15/G and the active component is nickel. The preparation method of the low-temperature and high-efficiency ammonia decomposition catalyst includes the following steps. Ni(OH)$_2$ is mixed with SBA-15/G composite support by simple mechanical mixing method. Then, Ni/SBA-15/G supported catalyst is prepared by calcination in ammonia atmosphere. The ammonia decomposition activity of prepared materials at low-temperature is higher than that of most current Ni-based catalysts, and the method has the advantages of simple preparation process and low cost, and exhibits high catalytic activity and stability in the ammonia decomposition reaction.

5 Claims, 11 Drawing Sheets

(51) Int. Cl.
  *B01J 37/04* (2006.01)
  *B01J 37/08* (2006.01)
  *C01B 3/04* (2006.01)

(56) References Cited

OTHER PUBLICATIONS

Liang et al., Catalytic decomposition of ammonia over nitride MoNx/α-Al2O3 and NiMoNy/ α-Al2O3 catalysts, Ind. Eng. Chem. Res., 2000 (Liang) (Year: 2000).*
Machine translation of Wang et al., CN106475132A (Year: 2017).*
Lof et al., A Calorimetry and Light Scattering Study of the Formation and Shape Transition of Mixed Micelles of EO20PO68EO20 Triblock Copolymer (P123) and Nonionic Surfactant (C12EO6), The journal of Physical Chemistry B, 2007 (Year: 2007).*
Sigma, Nickel Acetylacetonate, https://www.sigmaaldrich.com/US/en/product/aldrich/283657?srsltid=
AfmBOoo1TFRyeAhHliuW7yPIFtfNK9bTv-
ayHbTdLwyCIXH5AKVrZ612 (Year: 2025).*

\* cited by examiner

LOW-TEMPERATURE AND HIGH-EFFICIENCY AMMONIA DECOMPOSITION CATALYST, PREPARATION METHOD AND APPLICATION THEREOF

CROSS REFERENCE TO RELATED APPLICATION

This patent application claims the benefit and priority of Chinese Patent Application No. 202210986606.1 filed on Aug. 17, 2022, the disclosure of which is incorporated by reference herein in its entirety as part of the present application.

TECHNICAL FIELD

The present disclosure relates to the technical field of catalysts, and more specifically, to a low-temperature and high-efficiency ammonia decomposition catalyst, and its preparation method and application.

BACKGROUND ART

With the increase of traditional fossil energy consumption, the global warming problem is becoming more and more serious. Therefore, reducing greenhouse gas (carbon dioxide, etc.) emissions and mitigating climate warming have become the common goal of all mankind. The application of ecological renewable energy carriers in carbon neutrality has received extensive attention. Among the alternative energy sources, hydrogen, as a sustainable and environmentally friendly energy, is the most promising to help achieve carbon neutrality in the future.

However, there are still many difficulties in obtaining high-purity hydrogen at low cost, simple preparation and safe storage and transportation. As an ideal hydrogen storage material, ammonia is easy to liquefy and transport under mild conditions, and can also be mass produced through mature synthetic ammonia process. At the same time, only hydrogen and nitrogen which are pollution-free to human living environment are produced through catalytic ammonia decomposition. Therefore, catalytic ammonia decomposition to obtain high-purity hydrogen is a promising hydrogen production method. However, due to the limitation of dynamics factors, it is still challenging to use ammonia decomposition to produce hydrogen without catalyst.

At present, catalysts with high ammonia decomposition activity mainly include ruthenium-based (Ru), nickel-based (Ni), iron-based (Fe) and cobalt-based (Co) catalysts. Among them, Ru-based catalysts show the highest catalytic activity, but the high cost and limited availability limit their industrial application. Relatively speaking, metal Ni has abundant reserves, low price and high ammonia decomposition activity, so it has a good application prospect. The literature results show that most of the industrial hydrogen production by ammonia decomposition uses Ni-based catalysts, the reaction temperature is above 800° C., the energy consumption is high, and the catalysts are easy to inactivate.

Therefore, it is an urgent problem for those skilled in the art to provide a low-temperature, high-efficiency and stable Ni-based catalyst for ammonia decomposition.

SUMMARY

In view of the above, the present disclosure provides a low-temperature and high-efficiency ammonia decomposition catalyst and its preparation method and application, which overcomes the disadvantages of the prior art, such as complex preparation process and long process of the supported nickel-based catalyst, poor low-temperature catalytic activity and poor ammonia decomposition performance of the prepared catalyst.

In order to achieve the above object, the present disclosure adopts the following technical solutions.

A low-temperature and high-efficiency ammonia decomposition catalyst includes a support and an active component. The support is SBA-15/G and the active component is nickel.

In recent years, researchers have pointed out that by modifying the electronic structure of metallic materials, it can achieve the purpose of optimizing the adsorption energy on the surface of reactants, which can enhance the catalytic activity of catalysts. Graphene materials with excellent physicochemical properties are widely used by researchers in various fields. Graphene materials have been well recognized in the field of catalysis as a catalyst support. However, for the high temperature reaction of ammonia decomposition (generally around 600° C.), using graphene alone as the support of metal catalysts to prepare supported metal catalysts will inevitably suffer from problems such as metal particle aggregation and serious agglomeration and restacking of graphene nanosheets. Therefore, to overcome these inadequacies, the present disclosure assembles an SBA-15 layer on the surface of graphene nanosheets, which not only prevents the restacking of graphene nanosheets, but also prevents the metal particles from sintering into larger species during synthesis and catalysis due to the confinement effect of SBA-15.

Preferably, the content of the active component is 10-30 wt %.

Preferably, the particle size of the catalyst is 20-40 mesh.

A preparation method of a low-temperature and high-efficiency ammonia decomposition catalyst includes the following steps.

(1) A composite support SBA-15/G is prepared by sol gel method.

(2) A nickel precursor salt is mechanically mixed with the composite support SBA-15/G in an aqueous solution, then the composite support is dried, and the dried composite support is calcinated in an ammonia atmosphere to obtain the low-temperature and high-efficiency ammonia decomposition catalyst.

The common method for the preparation of supported nickel-based catalysts reported in the current literature is the impregnation method, and the route to prepare the catalysts by this method is to first synthesize nickel nanoparticles by liquid-phase reduction method, calcinate to obtain a high specific surface support, then impregnate supported nickel nanoparticles, and prepare the supported nickel-based catalysts by reduction. This preparation process is cumbersome, time-consuming, costly, and the prepared catalyst has limited activity. The preparation process of the present disclosure is simple, low-cost, and the prepared catalyst exhibits high catalytic activity and stability in ammonia decomposition.

Preferably, the sol gel method in step (1) includes: mixing and stirring P123, graphene, hydrochloric acid and deionized water, slowly dropping ethyl silicate and continuing stirring, and then aging, washing, drying, heat treatment and cooling the obtained gel to obtain the composite support SBA-15/G.

Preferably, the condition of the mixing and stirring is as follows: the stirring is at 25-50° C. for 12-48 h, and the continuing stirring is for 12-48 h.

Preferably, the condition of the thermally treating is as follows: the temperature is raised to 300-500° C. at 1-10° C.·min$^{-1}$ and kept for 2-4 h.

Preferably, the concentration of the hydrochloric acid is 1-2.5 mol/L, and a mass ratio of the P123, the graphene, the hydrochloric acid, the deionized water and the ethyl silicate is 6:1:180:45:12.75.

Preferably, the nickel precursor salt in step (2) is any one of Ni(OH)$_2$, Ni(CH$_3$COO)$_2$·4H$_2$O and Ni(acac)$_2$. The condition of the calcinating is as follows. Under a high-purity ammonia gas atmosphere with a flow rate of 10-50 ml·min$^{-1}$, the temperature is raised to 400° C. at 1-10° C.·min$^{-1}$ for 10 min, and then the temperature is raised to 500-700° C. at 1-5° C.·min$^{-1}$ for 2 h.

An application of the low-temperature and high-efficiency ammonia decomposition catalyst or the low-temperature and high-efficiency ammonia decomposition catalyst prepared by the above preparation method in hydrogen production by ammonia decomposition is provided.

Preferably, the steps of the application are as follows. The catalyst is packed in a quartz tube of the reaction setup of hydrogen production by ammonia decomposition, and activated at 500° C. for 2 h under a high pure ammonia atmosphere before the catalytic reaction. After the end of the activation, the reaction temperature is reduced to that at the beginning of the test. And finally, the hydrogen production by ammonia decomposition is performed in an ammonia atmosphere at 350-600° C.

Compared with the prior art, the disclosure has the following beneficial effects.

(1) The catalyst of the present disclosure, which combines the electron transport capability possessed by graphene with the sterically confined feature of SBA-15, can effectively promote the association and desorption of single atoms. Moreover, the preparation method of SBA-15/G composite support is simple and easy to realize the scale-up production.

(2) The catalyst provided by the present disclosure has higher ammonia decomposition activity at low-temperature than most Ni-based catalysts at present, and can start the conversion at 350° C.

(3) The catalyst provided by the present disclosure, when used for hydrogen production by ammonia decomposition, possesses good catalytic activity. The tested results showed that the best catalytic activity for ammonia decomposition was obtained with an ammonia gas activation flow rate of 20 ml·min$^{-1}$, a Ni content of 20 wt %, and an ammonia gas activation temperature of 400° C., which achieved 99.9% ammonia gas conversion at a space velocity of 6000 mL·g$_{cat}^{-1}$·h$^{-1}$ and a temperature of 550° C..

(4) The catalyst provided by the present disclosure is with good thermal stability. In the stability test of 60 h, the activity of ammonia decomposition reaction remained stable throughout.

BRIEF DESCRIPTION OF THE DRAWINGS

In order to explain the embodiments of the present disclosure or the technical solutions in the prior art more clearly, the following drawings that need to be used in the description of the embodiments or the prior art will be briefly introduced. Obviously, the drawings in the following description are only embodiments of the present disclosure. For those of ordinary skill in the art, other drawings can be obtained based on the drawings disclosed without creative work.

DETAILED DESCRIPTION OF THE EMBODIMENTS

Technical solutions of the present disclosure will be clearly and completely described below with reference to the embodiments. Obviously, the described embodiments are only part of the embodiments of the present disclosure, not all of them. Based on the embodiments of the disclosure, all other embodiments made by those skilled in the art without sparing any creative effort should fall within the protection scope of the disclosure.

Embodiment 1

A preparation method of an ammonia decomposition catalyst included the following steps.

(1) Preparation of SBA-15/G composite support: 6.0 g P123, 1.0 g graphene, 180.0 g 2M hydrochloric acid and 45.0 g deionized water were added to a 500 ml beaker and placed in a water bath at 35° C. for 24 h under stirring. Then 12.75 g of ethyl orthosilicate was weighed, slowly dropped into the beaker, and stirred for 24 h to obtain a gel. The obtained gel was subsequently aged at 80° C. for 12 h. The aged gel was filtered and washed with deionized water several times. After natural drying for 12 h, the gel temperature was raised to 400° C. in a muffle furnace at 2° C.·min$^{-1}$ for 4 h to obtain SBA-15/G composite support.

(2) Preparation of Ni/SBA-15/G catalyst: 0.144 g Ni(OH)$_2$, 0.2 g SBA-15/G and 20 mL deionized water were added into a 50 mL beaker and stirred for 24 h. The catalyst dried under vacuum at 60° C. for 12 h was thermally treated in a high-purity ammonia atmosphere after grinding to powder. The ammonia gas activated flow rate was 20 mL·min$^{-1}$, and the temperature was raised from 100 to 400° C. at 2° C.·min$^{-1}$ for 10 min and from 400 to 500° C. at 5° C.·min$^{-1}$ for 2 h to obtain the Ni/SBA-15/G catalyst with a Ni content of 30 wt %.

Figure 1:
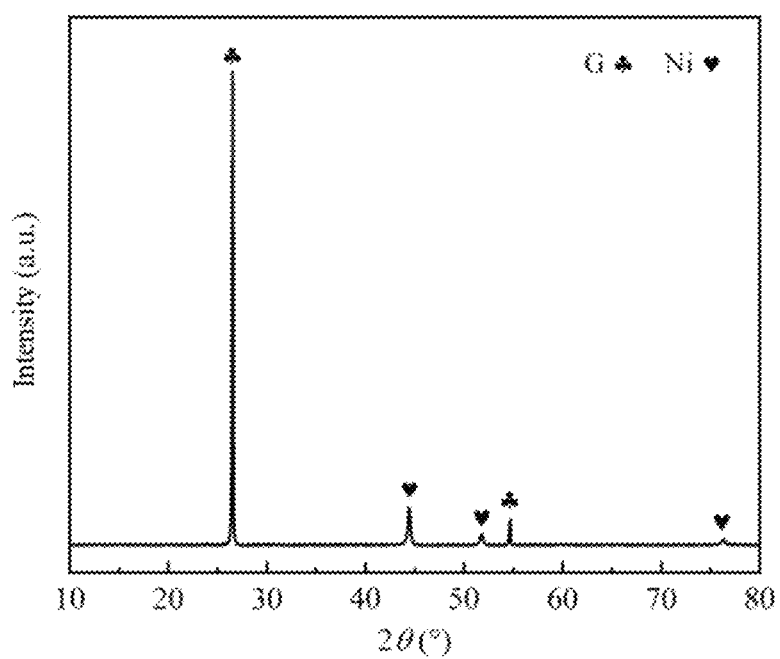
FIG. 1 is an X-ray powder diffraction pattern of the ammonia decomposition catalyst prepared in embodiment 1 of the present disclosure.

X-ray powder diffraction was employed to characterize the crystal phase structure of the above prepared catalyst, as shown in FIG. 1. The diffraction peaks where 2θ is equal to 44.5°, 51.8° and 76.5° correspond to the (111), (200), (220) crystal planes of Ni as a face centered cubic structure, and the diffraction peaks where 2θ is equal to 26.5° and 54.6° correspond to graphene characteristic peaks.

Figure 8:
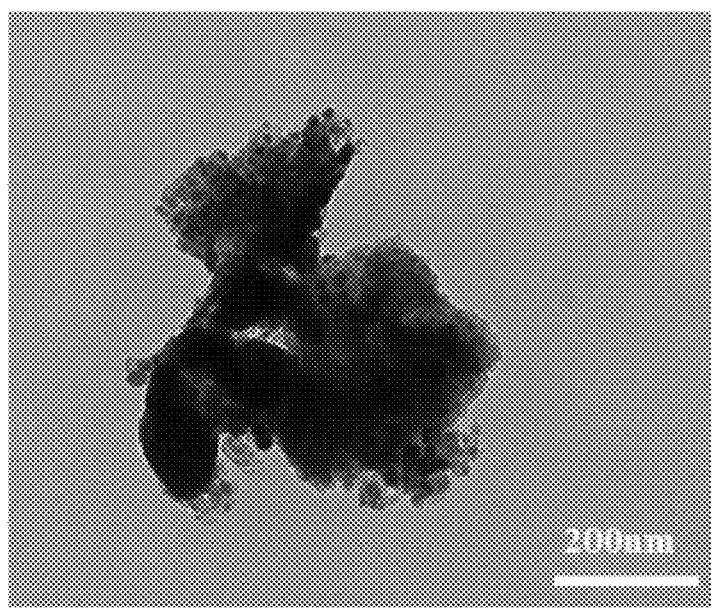
FIG. 8 is a transmission electron microscopy (TEM) image of the ammonia decomposition catalyst prepared in embodiment 1 of the present disclosure.

FIG. 8 is the TEM image of the above catalyst, and it can be seen that the nickel particles in the catalyst are uniformly dispersed on the support, and the particle size is smaller.

Embodiment 2

A preparation method of an ammonia decomposition catalyst included the following steps.

(1) Preparation of SBA-15/G composite support: 6.0 g P123, 1.0 g graphene, 180.0 g 2M hydrochloric acid and 45.0 g deionized water were added to a 500 ml beaker and placed in a water bath at 35° C. for 24 h under stirring. Then 12.75 g of ethyl orthosilicate was weighed, slowly dropped into the beaker, and stirred for 24 h to obtain a gel. The obtained gel was subsequently aged at 80° C. for 12 h. The aged gel was filtered and washed with deionized water several times. After natural drying for 12 h, the gel temperature was raised to 400° C. in a muffle furnace at 2° C.·min$^{-1}$ for 4 h to obtain SBA-15/G composite support.

(2) Preparation of Ni/SBA-15/G catalyst: 0.0828 g Ni (OH)$_2$, 0.2 g SBA-15/G and 20 mL deionized water were added into a 50 mL beaker and stirred for 24 h. The catalyst dried under vacuum at 60° C. for 12 h was thermally treated in a high-purity ammonia atmosphere after grinding to powder. The ammonia gas activated flow rate was 20 mL·min$^{-1}$, and the temperature was raised from 100 to 400° C. at 2° C.·min$^{-1}$ for 10 min and from 400 to 500° C. at 5° C.·min$^{-1}$ for 2 h to obtain the Ni/SBA-15/G catalyst with a Ni content of 20 wt %.

Figure 5:
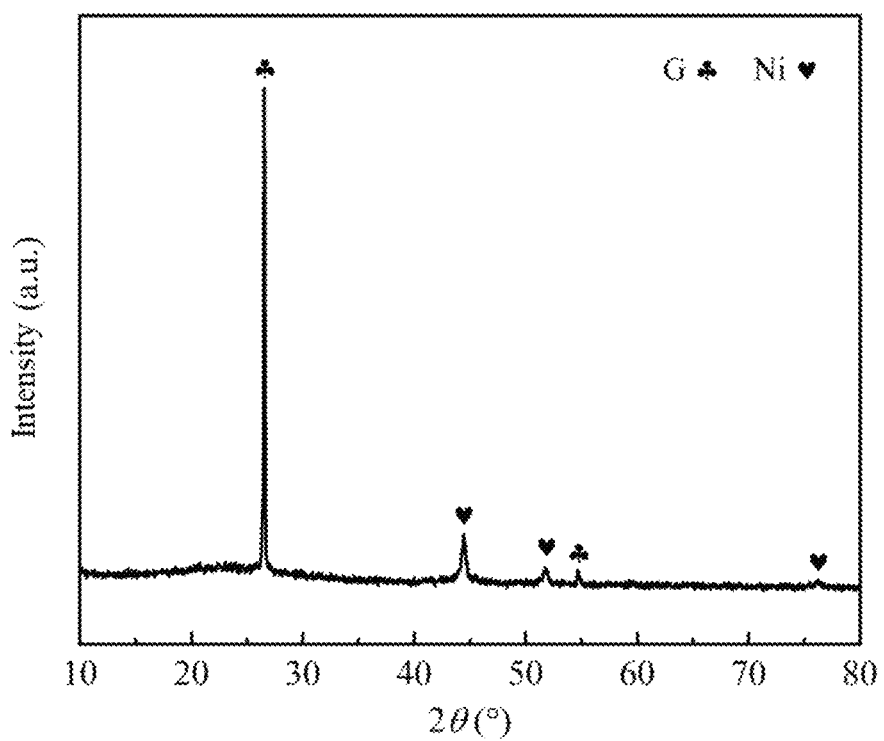
FIG. 5 is an X-ray powder diffraction pattern of the ammonia decomposition catalyst prepared in comparative example 2 of the present disclosure.

X-ray powder diffraction was employed to characterize the crystal phase structure of the above prepared catalyst, as shown in FIG. 5. The diffraction peaks where 2θ is equal to 44.5°, 51.8° and 76.5° correspond to the (111), (200), (220) crystal planes of Ni as a face centered cubic structure, and the diffraction peaks where 2θ is equal to 26.5° and 54.6° correspond to graphene characteristic peaks.

Embodiment 3

A preparation method of an ammonia decomposition catalyst included the following steps.

(1) Preparation of SBA-15/G composite support: 6.0 g P123, 1.0 g graphene, 180.0 g 2M hydrochloric acid and 45.0 g deionized water were added to a 500 ml beaker and placed in a water bath at 35° C. for 24 h under stirring. Then 12.75 g of ethyl orthosilicate was weighed, slowly dropped into the beaker, and stirred for 24 h to obtain a gel. The obtained gel was subsequently aged at 80° C. for 12 h. The aged gel was filtered and washed with deionized water several times. After natural drying for 12 h, the gel temperature was raised to 400° C. in a muffle furnace at 2° C.·min$^{-1}$ for 4 h to obtain SBA-15/G composite support.

(2) Preparation of Ni/SBA-15/G catalyst: 0.0438 g Ni (OH)$_2$, 0.2 g SBA-15/G and 20 mL deionized water were added into a 50 mL beaker and stirred for 24 h. The catalyst dried under vacuum at 60° C. for 12 h was thermally treated in a high-purity ammonia atmosphere after grinding to powder. The ammonia gas activated flow rate was 20 mL·min$^{-1}$, and the temperature was raised from 100 to 400° C. at 2° C.·min$^{-1}$ for 10 min and from 400 to 500° C. at 5° C. min$^{-1}$ for 2 h to obtain the Ni/SBA-15/G catalyst with a Ni content of 10 wt %.

Figure 4:
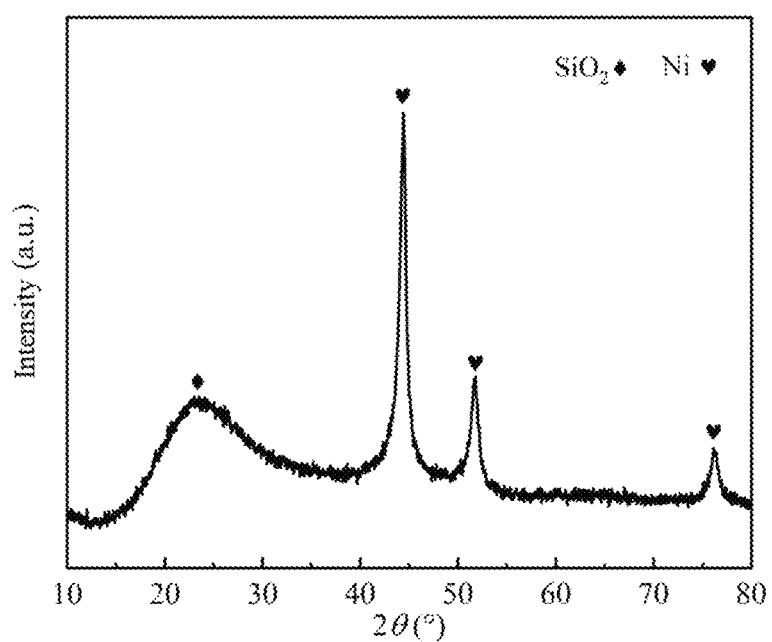
FIG. 4 is an X-ray powder diffraction pattern of the ammonia decomposition catalyst prepared in comparative example 1 of the present disclosure.

X-ray powder diffraction was employed to characterize the crystal phase structure of the above prepared catalyst, as shown in FIG. 4. The diffraction peaks where 2θ is equal to 44.5°, 51.8° and 76.5° correspond to the (111), (200), (220) crystal planes of Ni as a face centered cubic structure, and the diffraction peaks where 2θ is equal to 26.5° and 54.6° correspond to graphene characteristic peaks.

Comparative Example 1

A preparation method of an ammonia decomposition catalyst included the following steps.

(1) Preparation of SBA-15 support: 6.0 g P123, 180.0 g 2M hydrochloric acid and 45.0 g deionized water were added to a 500 ml beaker and placed in a water bath at 35° C. for 24 h under stirring. Then 12.75 g of ethyl orthosilicate was weighed, slowly dropped into the beaker, and stirred for 24 h to obtain a gel. The obtained gel was subsequently aged at 80° C. for 12 h. The aged gel was filtered and washed with deionized water several times. After natural drying for 12 h, the gel temperature was raised to 400° C. in a muffle furnace at 2° C.·min$^{-1}$ for 4 h to obtain SBA-15/G composite support.

(2) Preparation of Ni/SBA-15/G catalyst: 0.0438 g Ni (OH)$_2$, 0.2 g SBA-15 and 20 mL deionized water were added into a 50 mL beaker and stirred for 24 h. The catalyst dried under vacuum at 60° C. for 12 h was thermally treated in a high-purity ammonia atmosphere after grinding to powder. The ammonia gas activated flow rate was 20 mL·min$^{-1}$, and the temperature was raised from 100 to 400° C. at 2° C.·min$^{-1}$ for 10 min and from 400 to 500° C. at 5° C.·min$^{-1}$ for 2 h to obtain the Ni/SBA-15 catalyst with a Ni content of 30 wt %.

Figure 2:
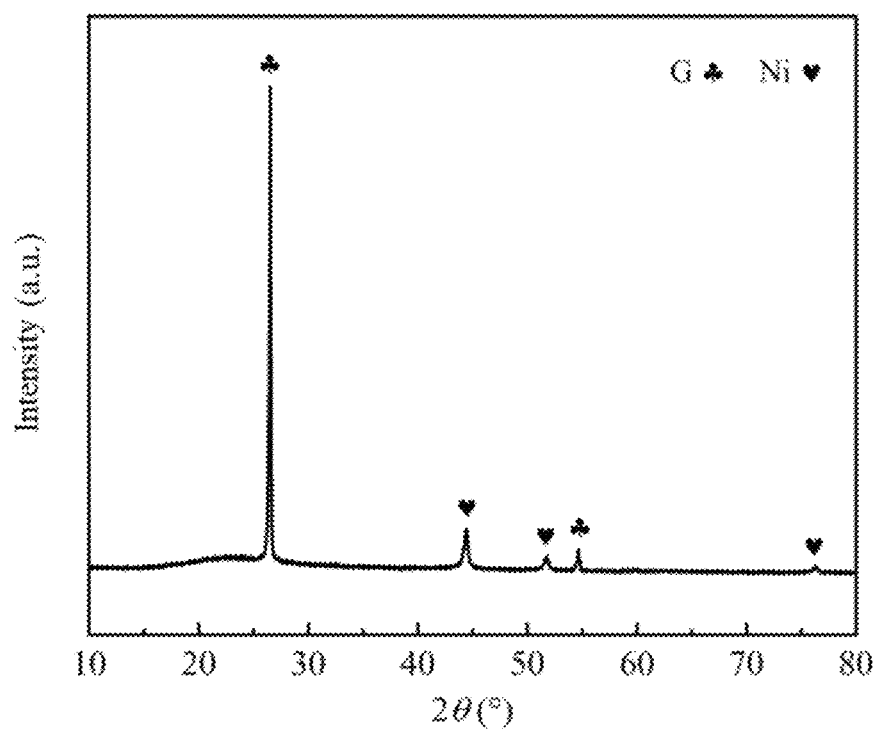
FIG. 2 is an X-ray powder diffraction pattern of the ammonia decomposition catalyst prepared in embodiment 2 of the present disclosure.
Figure 3:
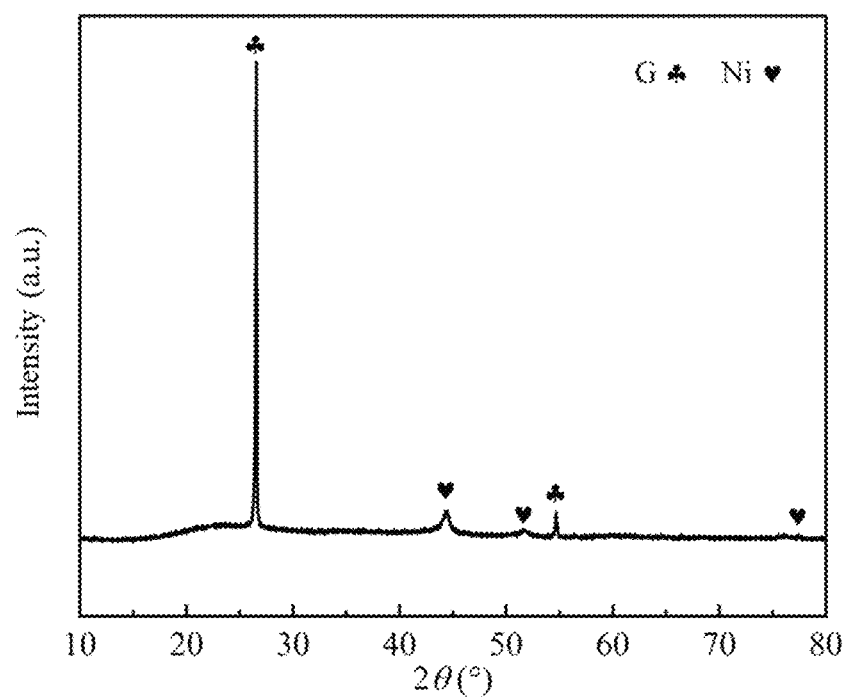
FIG. 3 is an X-ray powder diffraction pattern of the ammonia decomposition catalyst prepared in embodiment 3 of the present disclosure.

X-ray powder diffraction was employed to characterize the crystal phase structure of the above prepared catalyst, as shown in FIG. 2. The diffraction peaks where 2θ is equal to 44.5°, 51.8° and 76.5° correspond to the (111), (200), (220) crystal planes of Ni as a face centered cubic structure.

Figure 9:
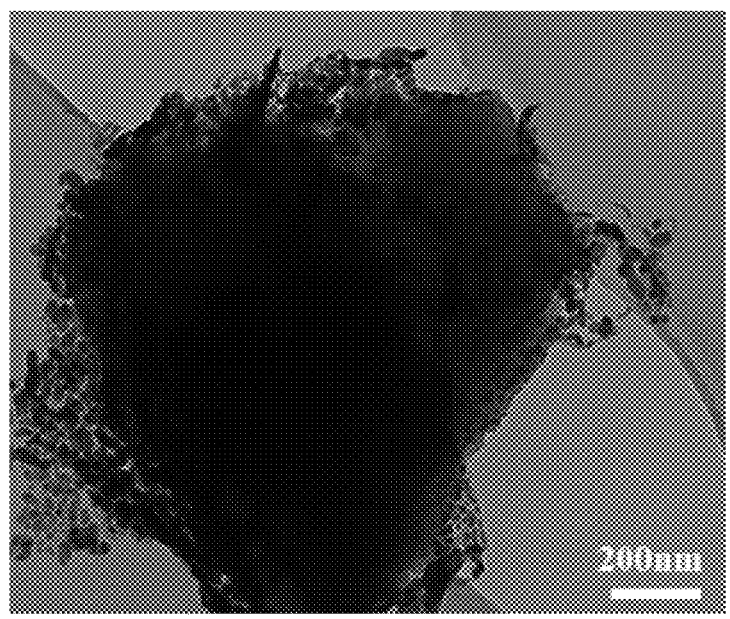
FIG. 9 is a TEM image of the ammonia decomposition catalyst prepared in comparative example 1 of the present disclosure.

FIG. 9 is the TEM image of the above catalyst. In this figure, it can be observed that the support of the catalyst is ordered pore channel structure, the nickel particles are distributed more evenly on the support, but appear partially agglomerated.

Comparative Example 2

A preparation method of an ammonia decomposition catalyst included the following steps.

(1) Treatment of G support: G was heated to 400° C. at 2° C.·min$^{-1}$ in a muffle furnace and kept for 4 h to obtain the treated G support.

(2) Preparation of Ni/G catalyst: 0.144 g Ni (OH)$_2$, 0.2 g G and 20 mL deionized water were added into a 50 mL beaker and stirred for 24 h. The catalyst dried under vacuum at 60° C. for 12 h was thermally treated in a high-purity ammonia atmosphere after grinding to powder. The ammonia gas activated flow rate was 20 mL min$^{-1}$, and the temperature was raised from 100 to 400° C. at 2° C.·min⁻¹ for 10 min and from 400 to 500° C. at 5° C.·min⁻¹ for 2 h to obtain the Ni//G catalyst with a Ni content of 30 wt %.

X-ray powder diffraction was employed to characterize the crystal phase structure of the above prepared catalyst, as shown in FIG. 4. Where 2θ is equal to 26.5° and 54.6° correspond to graphene characteristic peaks.

Figure 10:
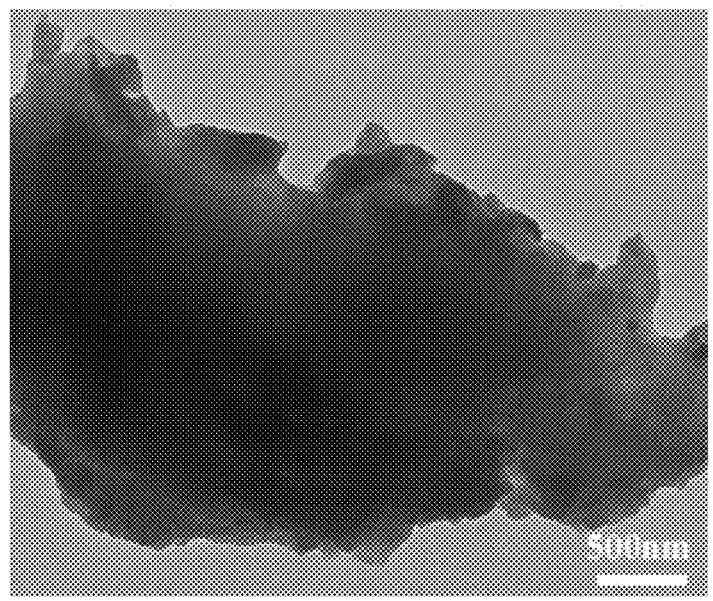
FIG. 10 is a TEM image of the ammonia decomposition catalyst prepared in comparative example 2 of the present disclosure.

FIG. 10 is the TEM image of the above catalyst, in which a small amount and inhomogeneous nickel particles on the catalysts can be observed, and the more serious stacking of graphene occurs.

Combining embodiment 1 and the comparative example 1, it is demonstrated that the confinement effect of SBA-15 can effectively inhibit the agglomeration of nickel particles.

Comparative Example 3

A preparation method of an ammonia decomposition catalyst included the following steps.

(1) Preparation of SBA-15/G composite support: 6.0 g P123, 1.0 g graphene, 180.0 g 2M hydrochloric acid and 45.0 g deionized water were added to a 500 ml beaker and placed in a water bath at 35° C. for 24 h under stirring. Then 12.75 g of ethyl orthosilicate was weighed, slowly dropped into the beaker, and stirred for 24 h to obtain a gel. The obtained gel was subsequently aged at 80° C. for 12 h. The aged gel was filtered and washed with deionized water several times. After natural drying for 12 h, the gel temperature was raised to 400° C. in a muffle furnace at 2° C.·min⁻¹ for 4 h to obtain SBA-15/G composite support.

(2) Preparation of Ni/SBA-15/G catalyst: 0.0828 g Ni(OH)₂, 0.2 g SBA-15/G and 20 mL deionized water were added into a 50 mL beaker and stirred for 24 h. The catalyst dried under vacuum at 60° C. for 12 h was thermally treated in a high-purity ammonia atmosphere after grinding to powder. The ammonia gas activated flow rate was 20 mL·min⁻¹, and the temperature was raised from 100 to 400° C. at 2° C.·min⁻¹ for 2 h to obtain the Ni/SBA-15/G catalyst with a Ni content of 20 wt %.

Figure 6:
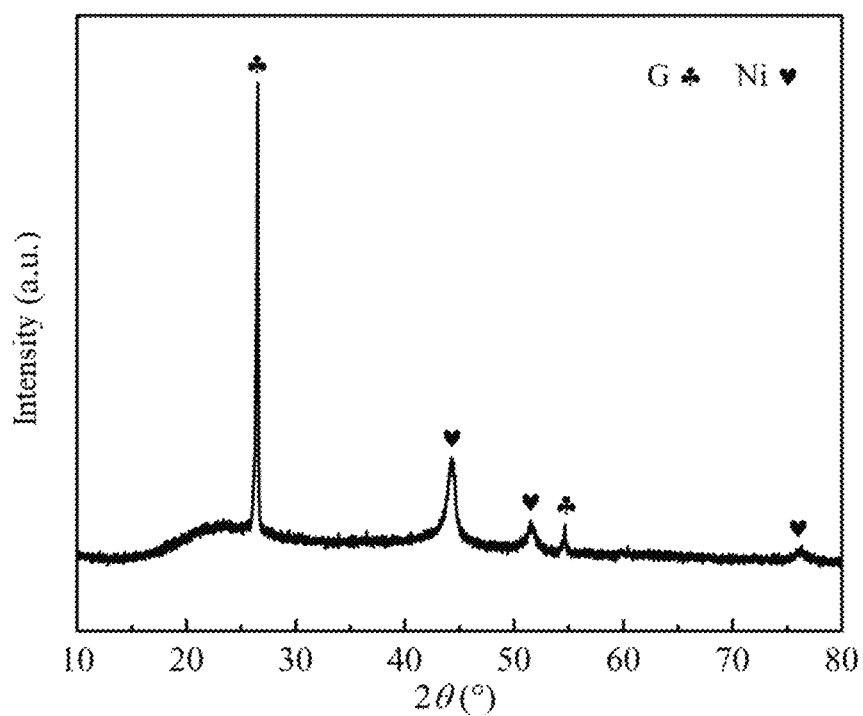
FIG. 6 is an X-ray powder diffraction pattern of the ammonia decomposition catalyst prepared in comparative example 3 of the present disclosure.

X-ray powder diffraction was employed to characterize the crystal phase structure of the above prepared catalyst, as shown in FIG. 6. The diffraction peaks where 2θ is equal to 44.5°, 51.8° and 76.5° correspond to the (111), (200), (220) crystal planes of Ni as a face centered cubic structure, and the diffraction peaks where 2θ is equal to 26.5° and 54.6° correspond to graphene characteristic peaks.

Comparative Example 4

(1) Preparation of SBA-15/G composite support: 6.0 g P123, 1.0 g graphene, 180.0 g 2M hydrochloric acid and 45.0 g deionized water were added to a 500 ml beaker and placed in a water bath at 35° C. for 24 h under stirring. Then 12.75 g of ethyl orthosilicate was weighed, slowly dropped into the beaker, and stirred for 24 h to obtain a gel. The obtained gel was subsequently aged at 80° C. for 12 h. The aged gel was filtered and washed with deionized water several times. After natural drying for 12 h, the gel temperature was raised to 400° C. in a muffle furnace at 2° C.·min⁻¹ for 4 h to obtain SBA-15/G composite support.

(2) Preparation of Ni/SBA-15/G catalyst: 0.0828 g Ni(OH)₂, 0.2 g SBA-15/G and 20 mL deionized water were added into a 50 mL beaker and stirred for 24 h. The catalyst dried under vacuum at 60° C. for 12 h was thermally treated in a high-purity ammonia atmosphere after grinding to powder. The ammonia gas activated flow rate was 20 mL·min⁻¹, and the temperature was raised from 100 to 400° C. at 2° C.·min⁻¹ for 10 min and from 400 to 600° C. at 5° C.·min⁻¹ for 2 h to obtain the Ni/SBA-15/G catalyst with a Ni content of 20 wt %.

Figure 7:
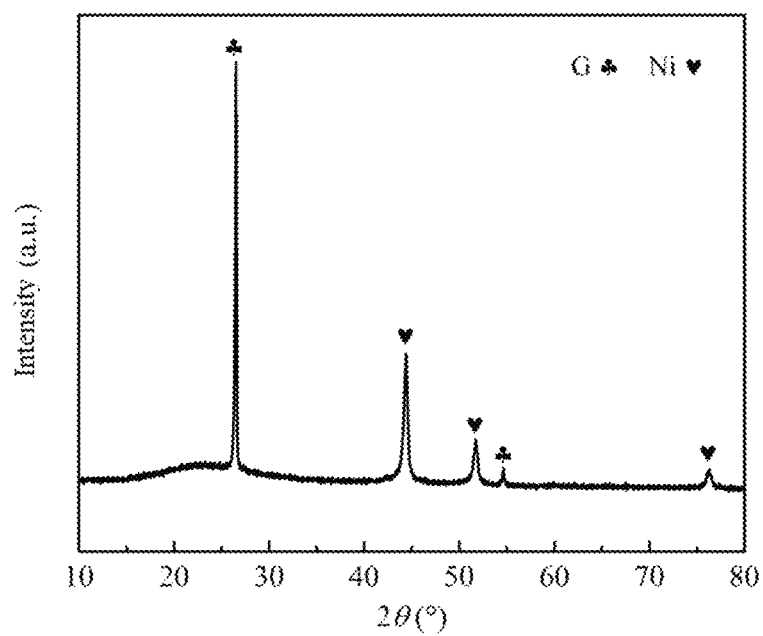
FIG. 7 is an X-ray powder diffraction pattern of the ammonia decomposition catalyst prepared in comparative example 4 of the present disclosure.

X-ray powder diffraction was employed to characterize the crystal phase structure of the above prepared catalyst, as shown in FIG. 7. The diffraction peaks where 2θ is equal to 44.5°, 51.8° and 76.5° correspond to the (111), (200), (220) crystal planes of Ni as a face centered cubic structure, and the diffraction peaks where 2θ is equal to 26.5° and 54.6° correspond to graphene characteristic peaks.

Test Example 1

The activity tests of the above catalysts were carried out on a reaction set-up of hydrogen production by ammonia decomposition equipped with gas chromatography. 100 mg catalyst (20~40 mesh) was taken to be packed in a quartz tube and activated at 500° C. for 2 h under a high-purity ammonia atmosphere before the catalytic reaction, and the reaction temperature was decreased to that at the beginning of the test after the end of the activation. Reaction conditions: the feed gas was high-purity ammonia gas at a flow rate of 10 ml·min⁻¹ and a space velocity of 6000 mL·g$_{cat}^{-1}$·h⁻¹, the reaction pressure was atmospheric pressure, and the reaction temperature was 350° C., 400° C., 450° C., 500° C., 550° C. and 600° C. According to the formula of ammonia conversion=(initial ammonia flow-ammonia flow after reaction)/initial ammonia flow×100%, the conversion of ammonia was calculated. The test results are shown in Table 1.

TABLE 1

Ammonia decomposition performance test of the above catalysts at 350~600° C.

| | Ammonia conversion (%) | | | | | |
|---|---|---|---|---|---|---|
| | 350° C. | 400° C. | 450° C. | 500° C. | 550° C. | 600° C. |
| Embodiment 1 | 6.0 | 14.9 | 51.0 | 83.6 | 99.3 | 99.9 |
| Embodiment 2 | 5.2 | 18.1 | 37.0 | 82.8 | 96.7 | 99.9 |
| Embodiment 3 | 3.1 | 10.4 | 24.0 | 68.0 | 92.3 | 99.7 |
| Comparative example 1 | 8.3 | 20.2 | 35.1 | 67.1 | 93.1 | 99.8 |
| Comparative example 2 | 1.0 | 4.3 | 10.5 | 24.3 | 35.1 | 40.2 |
| Comparative example 3 | 1.6 | 31.7 | 52.8 | 80.6 | 97.3 | 99.9 |
| Comparative example 4 | 0.4 | 5.8 | 26.6 | 59.7 | 95.8 | 99.9 |

From the data in Table 1, it can be seen that the activity of the ammonia decomposition catalysts prepared in embodiment 1, comparative example 1 and comparative example 2 show that the catalytic activity of the Ni-based catalyst supported on the composite support is significantly increased when the temperature is higher than 400° C., and the conversion rate can be greater than 99% at 550° C.

By further comparing the activities of the ammonia decomposition catalysts prepared in embodiment 1, embodiment 2 and embodiment 3, it can be seen that the catalytic activity of the catalysts increases with the increase of Ni content, but when the Ni content is higher than 20 wt %, the growth trend of conversion decreases. Considering the preparation cost of the catalyst and the atomic utilization rate of the active center, the catalyst with Ni content of 20 wt % was selected as the optimal sample.

Further comparing the activities of the ammonia decomposition catalysts prepared in embodiment 2, comparative example 3 and comparative example 4, it can be seen that the catalyst of comparative example 3, that is, the catalyst with Ni content of 20 wt % and ammonia activation temperature of 400° C. is selected as the optimal sample.

Test Example 2

Figure 11:
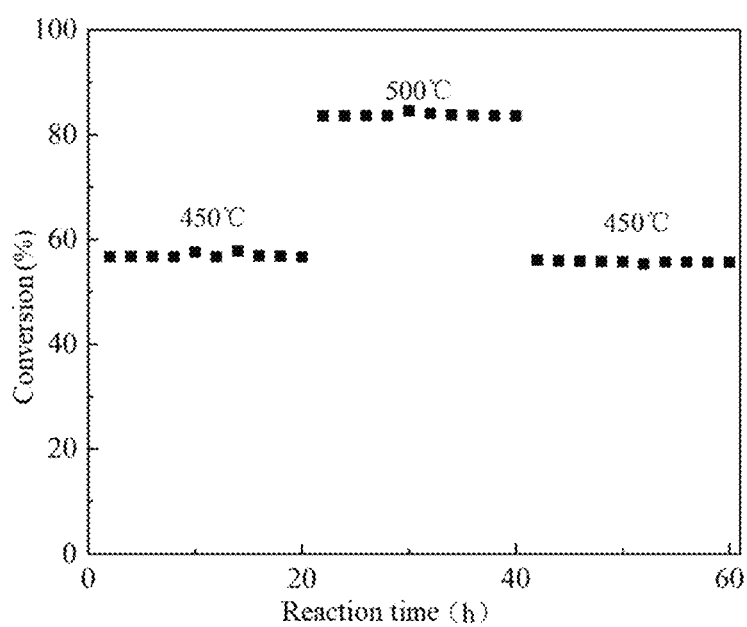
FIG. 11 is a graph showing the long-term stability test results to the ammonia decomposition reaction of the ammonia decomposition catalyst prepared in comparative example 3 of the present disclosure.

The long-term stability in the ammonia decomposition reaction at 450° C. of the catalyst prepared in comparative example 3 was tested, and the stability test of the ammonia decomposition reaction was carried out in a fixed bed reactor at atmospheric pressure. Reaction conditions: 100 mg catalyst was taken, feed gas was high-purity ammonia, flow rate was 10 ml min$^{-1}$, space velocity was 6000 mL·g$_{cat}^{-1}$·h$^{-1}$, and reaction pressure is atmospheric pressure. The test took 20 h as a cycle, and the temperature was first raised to 450° C., then raised to 500° C., and finally lowered back to 450° C. Three points were measured every 2 h and the average was taken to complete the stability test. The test results are shown in FIG. 11. After 60 h of reaction, the activity of the catalyst remained stable at 450° C., and there was no obvious downward trend, indicating that it had excellent catalytic stability.

Various embodiments in the present specification are described in a progressive manner, and the emphasizing description of each embodiment is different from the other embodiments. The same and similar parts of various embodiments can be referred to for each other.

The above description of the disclosed embodiments enables the skilled in the art to achieve or use the disclosure. Multiple modifications to these embodiments will be apparent to those skilled in the art, and the general principles defined herein may be achieved in other embodiments without departing from the spirit or scope of the disclosure. The present disclosure will therefore not be restricted to these embodiments shown herein, but rather to comply with the broadest scope consistent with the principles and novel features disclosed herein.

What is claimed is:

1. A preparation method of a low-temperature and high-efficiency ammonia decomposition catalyst, comprising:
   (1) preparing a composite support SBA-15/graphene by sol gel method;
   (2) mechanically mixing a nickel precursor salt and the composite support SBA-15/graphene in an aqueous solution, drying an obtained mixture and calcinating a dried mixture in an ammonia atmosphere to obtain the low-temperature and high-efficiency ammonia decomposition catalyst;
   wherein the nickel precursor salt in step (2) is any one of Ni(OH)$_2$, Ni(CH$_3$COO)$_2$·4H$_2$O and nickel acetylacetonate; a condition of the calcinating is as follows: under a high-purity ammonia gas atmosphere with a flow rate of 10-50 ml·min$^{-1}$, the temperature is raised to 400° C. at 1-10° C.·min$^{-1}$ and kept for 10 min, and then the temperature is raised to 500-700° C. at 1-5° C.·min$^{-1}$ and kept for 2 h.

2. The preparation method of a low-temperature and high-efficiency ammonia decomposition catalyst of claim 1, wherein the sol gel method in ste p (1) comprises: mixing and stirring poly (ethylene oxide)-poly (propylene oxide)-poly (et hylene oxide) triblock Copolymer (P123), graphene, hydrochloric acid and deioni zed water, slowly dropping ethyl silicate and continuing stirring, and then aging, wash ing, drying, thermally treating and cooling an obtained gel to obtain the composite support SBA-15/graphene.

3. The preparation method of a low-temperature and high-efficiency ammonia decomposition catalyst of claim 2, wherein a condition of the mixing and stirring, and the continuing stirring is as follows: the stirring is at 25-50° C. for 12-48 h, and the continuing stirring is for 12-48 h.

4. The preparation method of a low-temperature and high-efficiency ammonia decomposition catalyst of claim 2, wherein a condition of the thermally treating is as follows: the temperature is raised to 300-500° C. at 1-10° C.·min$^{-1}$ and kept for 2-4 h.

5. The preparation method of a low-temperature and high-efficiency ammonia decomposition catalyst of claim 2, wherein a concentration of the hydrochloric acid is 1-2.5 mol/L, and a mass ratio of the P123, the graphene, the hydrochloric acid, the deionized water and the ethyl silicate is 6:1:180:45:12.75.

* * * * *